United States Patent [19]

Maidhof

[11] 4,329,762
[45] May 18, 1982

[54] CLAMP CONNECTOR FOR VINES

[75] Inventor: Georg Maidhof, Carlsberg, Fed. Rep. of Germany

[73] Assignee: Maidhof GmbH, Carlsberg, Fed. Rep. of Germany

[21] Appl. No.: 143,647

[22] Filed: Apr. 25, 1980

[30] Foreign Application Priority Data

Sep. 6, 1979 [DE] Fed. Rep. of Germany ....... 2935987

[51] Int. Cl.³ ............................................. B65D 63/00
[52] U.S. Cl. ................................. 24/16 PB; 24/206 A; 47/44; 248/74 PB
[58] Field of Search ................. 24/261 R, 336, 16 PB, 24/206 A; 403/397, 400; 47/44, 45, 46, 47; 248/74 B, 74 PB

[56] References Cited

U.S. PATENT DOCUMENTS

| 562,947 | 6/1891 | Bennett et al. | 403/397 |
| 997,022 | 7/1911 | Tennant et al. | 24/261 |
| 2,315,825 | 4/1943 | Tallman | 403/397 |
| 3,359,019 | 12/1967 | Pinkey | 403/397 |
| 3,494,071 | 2/1970 | Simmon | 47/44 |
| 3,494,072 | 2/1970 | Olson | 47/44 |

FOREIGN PATENT DOCUMENTS

| 171469 | 11/1903 | Fed. Rep. of Germany . |
| 2451558 | 5/1976 | Fed. Rep. of Germany . |
| 2275992 | 1/1976 | France | 47/44 |
| 2433900 | 4/1981 | France | 47/44 |

Primary Examiner—James A. Leppink
Attorney, Agent, or Firm—McAulay, Fields, Fisher, Goldstein & Nissen

[57] ABSTRACT

A clamp connector formed of an elastically deformable but sufficiently plastic material to tie wires, rods, or shrubs together. A yoke is formed from a U-shaped member which is adapted for gripping around a rod, and a web is connected with the yoke. Three seats are provided which are aligned to receive the tie wire, rod or branch of a shrub, and together with the yoke provide for the interconnection of two of the wires, rods, or shrubs together.

22 Claims, 13 Drawing Figures

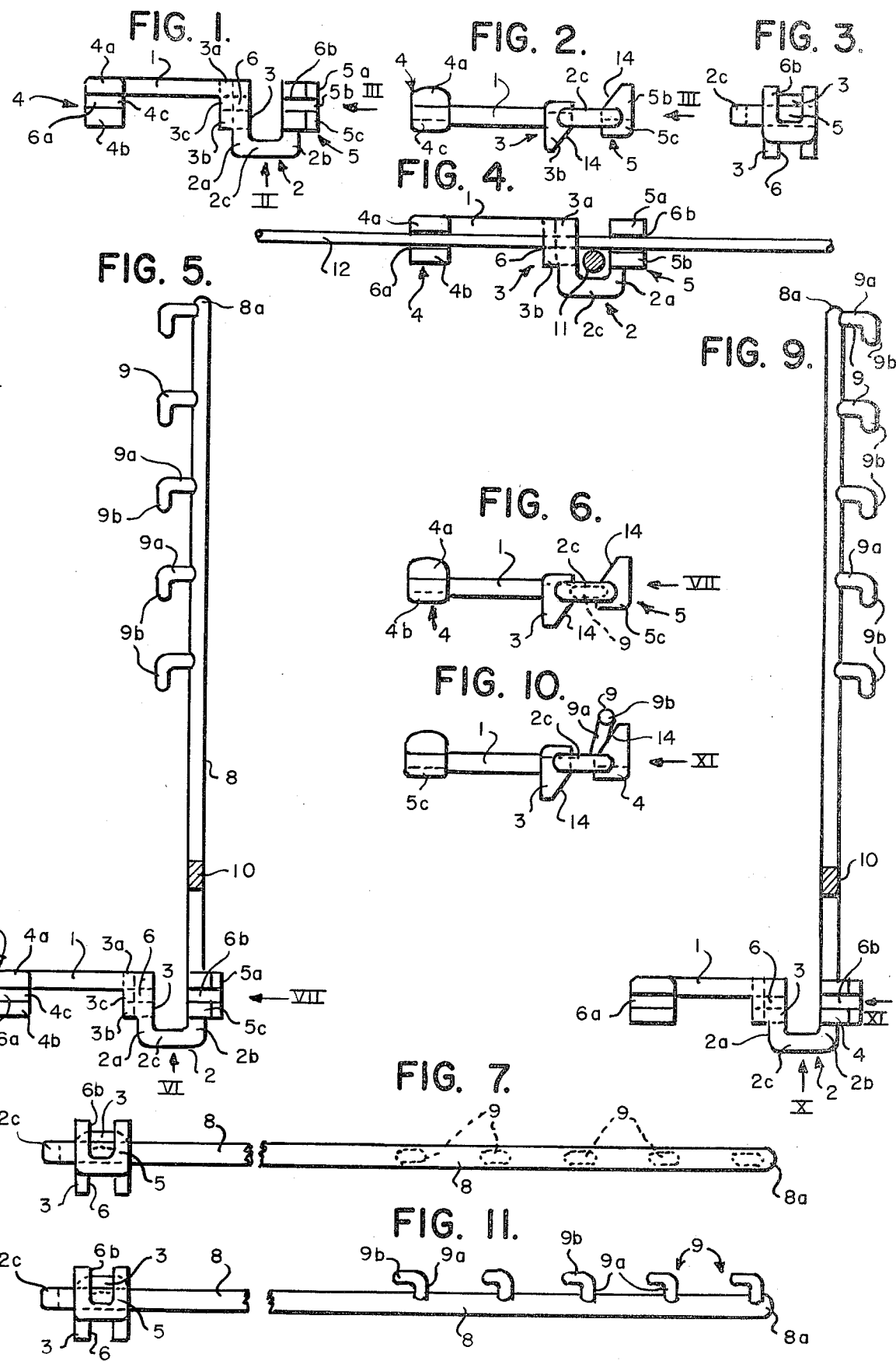

CLAMP CONNECTOR FOR VINES

BACKGROUND OF THE INVENTION

The invention relates to clamps for the connection of intersecting wires or rods and for the connection of shrubs to the rods.

More particularly, the invention is concerned with a clamp for the connections of two intersecting wires or rods which are intended to tie vines or other fruit-bearing shrubs. Specifically, the clamp is intended for the joining of a span wire with a fluted wire which can serve as a post; the span wire and the fluted wire are transverse to each other and cross with one overlaying the other in juxtaposition thereto.

It is known heretofore that vines in vineyards are to be tied to posts. The vines are tied to the posts and span wires which run in a transverse direction to the span wires. Use is made of string, bast or other suitable bending wire for tying the aforesaid to each other. This has been found to be cumbersome, time-consuming, and therefore quite costly.

The vines are tied to the posts for the vines and the span wires running transverse thereto by means of string, bast, or binding wire to each other. This is cumbersome, time-consuming and, therefore, costly.

It is therefore an object of the invention to facilitate the tying of the span wire and the post by means of an easy-to-handle and reliably functioning clamp which can be inexpensively produced and made from one piece of a long lasting durable plastic, and which, in particular, can be manufactured by the injection molding method. In order to accomplish the aforesaid object, the present invention proposes a clamp which is made of an elastically deformable but sufficiently stiff plastic and comprises a yoke for gripping around the wire or rod, the yoke is connected to three unilaterally open seating means such as forks, yokes, or with holding devices, each provided with a groove, flute, slot, notch or the like for the insertion of the fluted wire, the seating means have openings which are U-shaped, and transverse to each other or angularly displaced, the seating means includes three U-shaped channels, two of which open in the same direction, and the third, such as middle seating means opens or points in a direction opposite to that of the two outer seating means and do not be in a plane through the yoke or a plane parallel therto, a free space is provided between any two adjacent seating means so that the other wire or rod can pass therethrough, and the three seating means are staggered relative to each other so that the other wire or rod is prevented from lying in a straight line in the three seating means when the clamp is not deformed.

The mutual spacing of the ends of the yoke is smaller than the diameter of the one wire or rod it grips. The three seating means for the other wire or rod are located on extensions which emanate from the ends of the yoke in opposite directions with one seating means such as one of the outer seating means being coordinated with the one end of the yoke while the two others, the center or middle one and the other outer one are interconnected by a web are coordinated with the other end of the yoke. The bases of the three U-shaped seating means are in mutual alignment.

The aforesaid clamp accomplishes the foregoing object, and in order to tie two wires or rods, the clamp yoke is laid around the one wire or rod and the clamp itself is fastened to the other wire or rod by inserting the latter simultaneously into all three unilaterally open U-shaped seating means of the clamp. Since the openings of these three seating means point alternately in opposite directions, this other wire or rod is elastically clamped between the bases of the three seating means with the U or leg portions being used for transverse alignment. Either the wire or rod, or the clamp, or both are elastically deformed when inserting the wire or rod. To accomplish this, the base of the three U-shaped seating means are expediently arranged so as to be in mutual alignment with the bases of the two outer seating means lying in a common plane and the base of the center seating means lying in a plane spaced from the other two, a distance equal to, or preferably less than, the diameter of the other wire or rod. The clamping force can be increased further when the base of the middle seating means is offset or spaced from the line of alignment of the two outer seating means in the direction of the opening of the middle seating means. Due to the clamping force, a locking action because of friction is brought about between the clamp and this other wire or rod; only after overcoming the friction between the clamp and the other wire or rod can the clamp be moved on or along the other wire or rod.

The retention of the one wire or rod which serves as a post can be affected by designing the yoke as a detent into which the other wire or rod can be inserted or from which it can be removed only be means of elastic deformation of the yoke. As noted, heretofore, the spacing between the two bases of the U-shaped member is slightly less than the diameter of the other rod to provide for the required frictional holding. The one or post wire or rod which suitably serves as the post is held within the yoke and the other wire or rod by the other wire or rod which in turn is held by the three U-shaped seating means.

Preferably, the wire or rod which serves as the post is retained in the yoke by the other or transverse wire or rod; this transverse wire or rod when it is inserted into the three seating means is conducted so that the post is positioned between the transverse wire so that the yoke is closed by the transverse wire or rod. A suitable plastic material for the clamp is a polycarbonate material known as MAKROLON. This plastic is elastically deformable so that, depending upon the thickness of the clamp and the required stiffness and strength of the clamp, it can still be readily elastically deformed by hand to tie the wires or rods while providing for, on the other hand, an adequately string clamping force to lock the portions of interconnection of the two wires or rods with sufficient strength. The depth of the U or V-shaped slots are determined by the diameter of the transverse rod. But, the slots should not be unnecessarily deep so that the insertion of the transverse wire or rod is less cumbersome. To facilitate this insertion, the long web, at the end of which one of the outer seating means is located, is about 20 to 40 mm long. The procedure for the insertion of the transverse wire is to insert the transverse wire firstly into the two seating means directly adjacent to the yoke on one side thereof which is still possible easily without deforming the clamp. To insert the wire or rod into the third remaining seating means at the other end of and the other side of the yoke, the long web, the latter must be silightly bent elastically until the transverse wire or rod can snap into the seating means over the latter's edge. Since the web is relatively long, it can be bent as required by a moderate exertion of force.

Producing the clamp by injection molding and handling it are facilitated by providing the yoke and the web which connects the two of the three seating means to be in a common plane. Specifically, the web connecting the two oppositely facing seating means, both of which are disposed on the one side of the yoke, and the U-shaped yoke member lie in a common plane. The long web which connects the two of the three seating means on one side of the yoke is of a thickness, measured perpendicular to the plane through the yoke which is significantlly greater than the inside width of the seating means. Also, the web is rectangularly or oval-shaped in section, and the largest diameter of the oval in case of an oval or the broad side of the rectangle is perpendicular to the plane through the yoke. If the long web connecting two of the three seating means is molded as set forth, its side surface perpendicular to the plane through the yoke can serve to advantage as a contact surface for a vine to be tied at this point. Since the contact surface is considerably wider and less round than that of the span or transverse wire inserted into the three seating means or U-shaped slots, the web is effectively prevented from being grown into the vine The possibility of contacting and tying a vine is also furthered by making the length of the long web. If the vine were tied directly to the span wire, as currently customary, the danger would always be present of the span or transverse wire being grown into the vine.

Instead of tying the vine with string, bast or the like it can now be tied to advantage by means of an arm which is molded as integral part of the clamp. After the clamp has interconnected the two intersecting rods or wires, the vine is placed against the web between two of the three seating means, and the arm is then bent around the vine elastically, starting from one side of the yoke to be hooked to the span wire on the other side of the yoke by means of its hook. The arm thus roughly forms a semicircle.

In its released state the arm may be straight, but it may also be molded curved to limit the extent of the elastic deformation when tying the vine. The yoke for this purpose is formed with an extending arm from one leg of the U-shaped yoke which continues as an elastically flexible arm and which is at least approximately 50 mm, preferably approximately 150 mm long and from which arm at least one hook projects. Specifically, the extending arm is provided, with a plurality of identical hooks that project from the arm with regular mutual spacing between adjacent hooks starting approximately 50 mm away from the top of the yoke. Further, preferably the extending arm and the yoke and the web lie in one common plane. So that the arm may be suited for vines of various thicknesses it is preferably longer than 50 mm and equipped with a number of the aforesaid hooks which can individually be hooked to the one wire or span wire. The hooks can project from the arm perpendicularly with respect to the plane through the yoke and are L-shaped.

While the inventive features have been described in general terms, the invention contemplates three different embodiments which are directly related to each other to provide for clamps for clamping different types of vines and for different purposes all of which fall within the general scope of the disclosure of this invention. For example, the hooks and arm all lie in a common plane. However, the hooks may be differently oriented with respect to the common plane of the yoke and the extending arm. In one embodiment, the hooks, arm and yoke lie in a common plane, whereas in another embodiment, the hooks are rotated out of the common plane of the arm and the yoke.

Other objects, advantages and the nature of the invention will become readily apparent from the detailed description of the invention described in connection with the accompanying drawings.

BRIEF DESCRIPTION OF THE DRAWINGS

FIG. 1 is a top view of one embodiment of the clamp according to the invention for the interconnection of two wires on rods;

FIG. 2 is a bottom view of the clamp of FIG. 1 looking in the direction of II in FIG. 1;

FIG. 3 is a side view of the clamp of FIG. 1 looking in the direction of III in either FIG. 1 or FIG. 2;

FIG. 4 is a top view of the clamp of FIG. 1 showing the interconnections therewith with a fluted wire and a span wire and the point of intersection of the fluted wire and the span wire;

FIG. 5 is a top view in a manner, similar to FIG. 1 of another embodiment of the clamp according to the invention for the interconnection of thick vines with the clamps and includes and arm having hooks which lie in a plane containing the arm and another portion of the clamp transverse thereto;

FIG. 6 is a bottom view of the clamp of FIG. 5 looking in the direction of VI in FIG. 5, with the hook elements shown in dotted outline because they are hidden by the arm;

FIG. 7 is a side view of the clamp of FIG. 5 looking in the direction of VII in either FIG. 5 or FIG. 6;

FIG. 9 is a top view in a manner similar to FIG. 5 of another embodiment of the clamp according to the invention with the hooks on the arm rotated out of the plane as shown in the clamp of FIG. 5; and rotated through an angle of more than 90° but less than 180°;

FIG. 10 is a bottom view of the clamp of FIG. 9 looking in the direction of X with the hook elements shown in their full outline;

FIG. 11 is a side view of the clamp of FIG. 9 looking in the direction of XI in either FIG. 9 or FIG. 10;

DETAILED DESCRIPTION OF THE PREFERRED EMBODIMENTS

Figure 8:
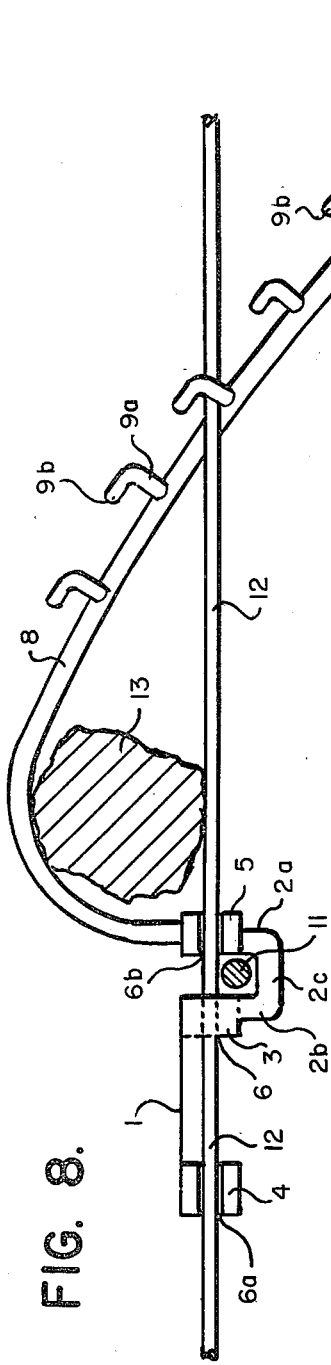
FIG. 8 is a top view of the clamp of FIG. 5 as used in the connection of a vine to a fluted wire and/or a span wire.
Figure 12:
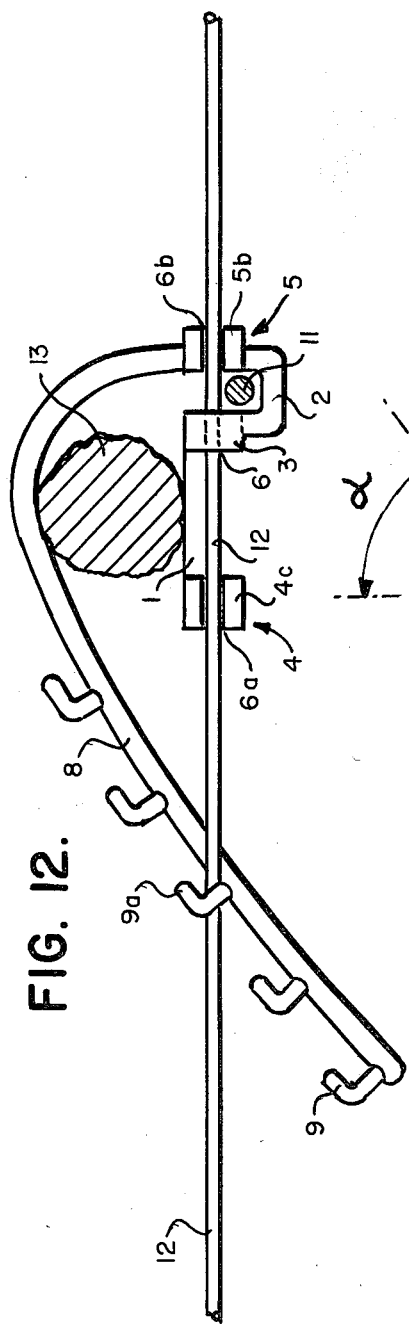
FIG. 12 is a top view of the clamp of FIG. 9 as used in the connection of a vine to a fluted wire and/or a span wire; and, FIG. 13 is a top view of a clamp as used in the connections of a vine to a fluted wire and/or a span wire, in which the hooks are rotated, through an angle of 90° out of the plane of the hooks as shown in FIG. 5 in which plane, the hooks, arm and another portion of the clamp transverse thereto all lie in a common plane.

Referring now more particularly to the drawings, all embodiments and variations of the clamp according to the invention include web 1 connected with U-shaped yoke 2.

Yoke 2 comprises a pair of legs 2a 2b interconnected by base 2c which joins the legs 2a, 2b to form U-shaped yoke 2. Web 1 is connected at one end thereof with leg 2a and is parallel to and is in the same plane as base 2c.

At the other end of web 1, there is provided an end piece 4 which is also in the form of a U-shaped member and includes two legs 4a, 4b, and a base 4c with a space or slot 6a being formed between legs 4a and 4b with the base of slot 6a. In one preferred embodiment, leg 4a is higher than leg 4b and may be rounded at the top.

Leg 2b is provided with another end piece 5 which is formed as a U-shaped member and includes two legs 5a, 5b, with a base portion 5c connecting legs 5a, 5b and having a space or slot 6b therebetween.

Intermediate the two outer end pieces 4, 5 is an intermediate U-shaped piece 3 having a pair of leg portions 3a, 3b, connected by a base portion 3c. The U-shaped member or intermediate piece 3 forms a slot or spaced portion 6 between legs 3a, 3b and base 3c is connected with leg 2a of yoke 2.

Slot 6 which is formed between legs 3a, 3b and extends therebetween parallel to base 2c of yoke 2 with base 2c being parallel to a member which would pass through slots 6a, 6b and 6. The bases of 6a and 6b are parallel to the base of slot 6, but the U-shaped slots 6a and 6b open in a direction opposite to slot 6; that is slot 6 faces in one direction and slots 6a, 6b open in a direction rotated 180° from the direction slot 6 opens.

End pieces 4 and 5 are thicker than web 1 and yoke 2. The bases 3c, 4c, 5c which also forms the bases of slots 6, 6a, 6b respectively, all lie in one common line of sight.

The span of yoke 2 preferably varies between 3 to 10 mm, and the length of web 1 preferably varies between 20 to 40 mm. In one preferred embodiment of the invention, the length of web 1 is twice the length of base 2c or the inside width of yoke 2. The variation of the ratio of the length of web 1 relative to base 2c will depend upon the items to be clamped as explained further hereinafter.

Referring now more particularly to FIGS. 1 to 4, the clamp as heretofore described and as specifically shown in these figures is the embodiment specifically intended for the connection of two intersecting wires or rods.

Specifically, references is made to FIGS. 1 which shows the clamp as shown in FIGS. 1 to 3 receiving a fluted wire or rod 11 in yoke 2 with legs 2a, 2b and base 2c particularly surrounding fluted wire 11 for connection with a span wire 12 extending in a direction transverse to wire 11. Fluted wire or rod 11 may serve as a post to which the clamp is connected, and it is held thereto by span wire 12 which intersects fluted wire 11. To lock span wire 12 to the clamp, span wire 12 is inserted into slot 6a, (open at the top), slot 6 (open at the bottom) and through slot 6b (open at the top) and web 1 is elastically bent or deformed by bending so that span wire 12 is elastically held against fluted wire 11 for locking thereof in yoke 2 by enclosing yoke 2 and completely surrounding fluted wire 11 together with legs 2a, 2b and base 2c.

Referring now more particularly to FIGS. 1 to 4, the clamp as heretofore described is specifically shown in these figures is intended for the connection of two intersecting wires or rods.

Specifically, reference is made to FIG. 1 which shows the clamp shown in FIGS. 1 to 3 receiving a fluted wire or rod 11 in yoke 2. with legs 2a, 2b and base 2c partially surrounding fluted wire 11 for connection with a span wire 12 extending in a direction transverse to wire 11. Fluted wire or rod 11 may serve as a post to which the clamp is connected, and it is held thereto by span wire 12 which intersects fluted wire 11. To lock span wire 12 to the clamp, span wire 12 is inserted into slot 6a (open at the top), slot 6 (open at the bottom) past fluted wire 11 and through slot 6b (open at the top), and web 1 is elastically bent or deformed by bending so that span wire 12 is elastically held against fluted wire 11 for locking thereof in yoke 2 by closing yoke 2 and completely surrounding fluted wire 11 together with legs 2a, 2b and base 2c.

To prevent a vine, when it is used to perform the function of span wire 12 from growing into the clamp, the diameter of web 1 should be made significantly larger than the span wire 12.

Referring now more particularly to FIGS. 5 to 8, which show another embodiment of the clamp according to the invention. In this embodiment, arm 8 is shown as having an oval cross-section 10 and is connected with one leg 5a and includes hooks 9 extending from arm 8. While arm 8 extends from leg 5a, it is substantially parallel to bases 3c, 4c, and 5c, and perpendicular to base 2c and web 1. Hooks 9 are L-shaped and have a first portion 9a extending in a direction perpendicular to arm 8 and a second portion 9b parallel to arm 8 and pointing away from the end 8a. Portions 9a and 9b form two legs of the L-shaped member 9.

The clamp of this embodiment is intended to tie-in particularly very old and thick vines 13. The orientation of hooks 9 are such that they be in a plane containing arm 8, base 2c, and web 1. While the hooks 9 lie in the aforementioned plane, they can be rotated out of the aforesaid plane.

In this embodiment, the clamp of FIGS. 5 to 8 can be used to form the clamp embodiment of FIGS. 1 to 3 by cutting off arm 8 at leg 5a. With respect to arm 8, the length of this arm may be made in variable lengths depending upon the ultimate use of the clamp. As vines get older, they become thicker, and it is necessary to have longer clamps. Hence, clamps with longer arms 8 would be used to tie very old vines. As shown in FIG. 8, the vine 13 is intended to be shown enlarged so that the clamp of this embodiment because of the orientation of hooks 9 is intended to be vines having a larger diametrical cross-section than the clamp of FIGS. 9 to 12 even if the lengths of arms 8 in both embodiments are the same size.

Referring to FIGS. 9 to 12, the clamp according to this embodiment, is generally similar to the clamp of FIGS. 5 to 8, but the hooks 9 are rotated out of the plane of the hooks in the FIG. 5 embodiment. Moreover, in this embodiment, the hooks are rotated more than 90° and less than 180° from the FIG. 5 embodiment.

Figure 13:
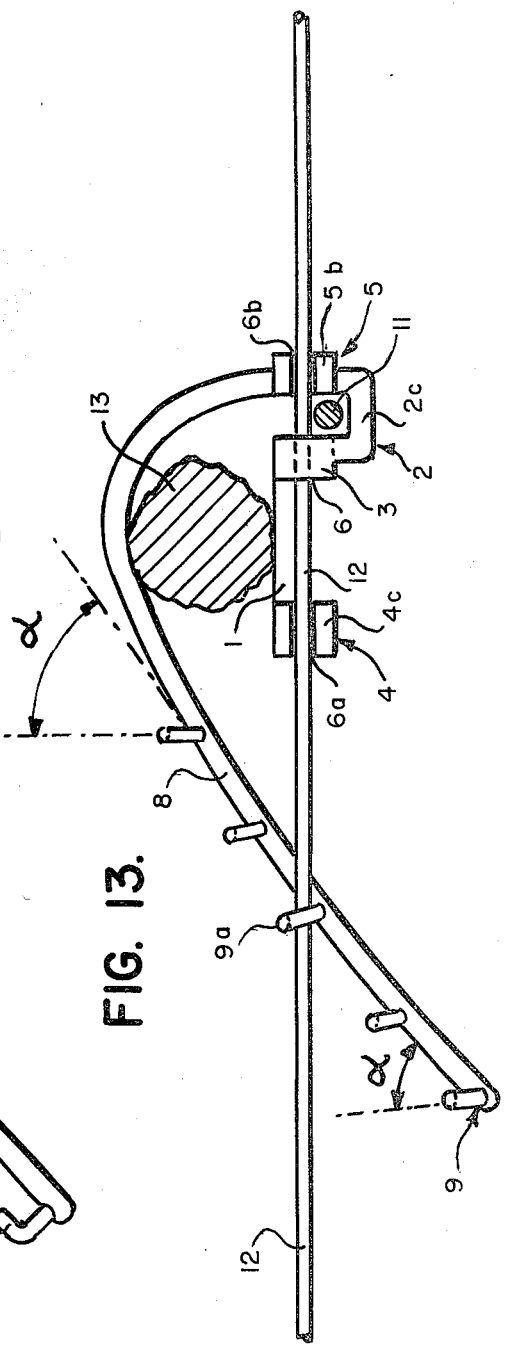

FIG. 13 shows a clamp according to the invention, in which the hooks 9 are rotated 90° from their position in the FIG. 5 embodiment.

Of course, it is within the scope of the invention for the hooks to be rotated less than 90° out of the plane of the FIG. 5 embodiment, and such use would be generally similar to the FIG. 5 embodiment and connected in a manner similar to the FIG. 8 usage. Moreover, depending on the usage intended and the size of arm 8, arm 8 when in the 90° position as shown in FIG. 13 could equally well be bent as shown in FIG. 4.

As shown in FIG. 13, the L-shaped hooks 9 are mounted parallel to each other on arm 8 with regular mutual spacing and perpendicular to the plane in which the yoke 2, web 1 and arm 8 lie. The hook points on leg 9b being on that side of the arm 8 which faces away from yoke 2 and points in a direction pointing away from the end 8a of arm 8 and forming an acute angle alpha with the arm 8.

To install the clamp on fluted wire 11, which serves as post and to span wire 12 intersecting fluted wire 11 at right angles, the clamp is moved towards the point of intersection of the two wires in an oblique position of about 45° relative to fluted wire 11 and also to span wire 12 so that fluted wire 11 is first introduced into the yoke 2 and span wire 12 thereafter. To facilitate this in all embodiments the thicker end pieces 3 and 4 on either side of yoke 2 are chamfered about 45° on two edges diagonally opposed on the inside of the yoke so that the chamfered surfaces 14 lie in planes which are parallel to each other and spaced apart from each other so that the distance between them at least equals the diameter of the fluted wire 11. Then the clamp is pivoted so that the span wire 12 is positioned in the seating means located on both sides of the yoke 2 and intended for it, namely slot 6 open on the bottom and slot 6b open on top. Now, in order to lock the clamp, span wire 12 must also be inserted into slot 6a which is open on top and located at the end of web 1. To accomplish this, web 1 is elastically deformed by bending it downwardly until the thicker end piece 4 can be pushed under span wire 12 and the latter snaps into the slot 6a. With span wire 12 in slots 6, 6a, 6b, the clamp is now clamped tightly to span wire 12, and span wire 12 locks the fluted wire 11 in the yoke 2 by closing the yoke 2 and completely surrounding fluted wire 11.

To tie a vine 13 standing next to a post which is generally indicated by fluted wire 11, the vine is leaned against web 1, then arm 8 is bent around it until it is in contact with vine 13 and hooked to the span wire 12 by one of the hooks 9. In the FIGS. 9 to 13 embodiments, vine 13 leans against the broad side of web 1, which offers the vine a much greater contact area than span wire 12 could as shown in the FIGS. 5 to 8 embodiment. Therefore, there is no danger of web 1 being grown into vine 13.

Due to the oblique position (angle alpha, FIG. 13) of the hooks 9, they are in a position approximately perpendicular to span wire 12 when being hooked to span wire 12, which makes for a very secure hold. But, the hold is still adequately secured when hook 9 and arm 8 lie in a common plane (i.e. angle alpha=0), the advantage of this position being a simpler design of the injection mold for the clamp.

While there has been shown and described what is considered to be the presently preferred mode of carrying out the invention, it will be obvious to those skilled in the art that various changes and modifications may be made therein without departing from the scope of the invention.

I claim:

1. A clamp connector formed of an elastically deformable but sufficiently plastic material to tie wires, rods or shrubs together, comprising;
    a yoke formed from a U-shaped member having a yoke base and two yoke legs adapted for gripping around a rod;
    a web having one end connected with said yoke and together with said yoke base lies in a first common plane;
    a first seating means including a first end piece connected with said web and forming one outer end piece;
    a second seating means including a second piece connected with one leg of said yoke and forming another outer end piece;
    a third seating means including an intermediate piece connected with said other leg of said yoke;
    each of said pair of leg portion having a free space therebetween;
    said outer end pieces opening in a first direction and said intermediate piece opening in a direction opposite to said first direction with the bases of said outer pieces lying in a second common plane parallel to said first common plane and the bases of said intermediate piece lying in a plane parallel to said first common plane with said free space between each said pair of leg portions of said pieces being aligned for gripping therebetween a span wire which extends in a direction transverse to said rod; and,
    said plane of the base of said intermediate piece being spaced from said second common plane a distance related to the diameter of the span wire to provide for a gripping effect among all three said bases of said pieces.

2. A clamp according to claim 1, wherein the bases of said three seating means are in mutual alignment.

3. The clamp according to claim 1 wherein said seating means and said yoke each have bases and extensions forming therewith U or V shaped slots.

4. The clamp according to claim 1, wherein said yoke is U-shaped and the span of the said yoke is 3 to 10 mm.

5. The clamp according to claim 1, wherein said web is approximately 20 to 40 mm long.

6. The clamp according to claim 1, wherein said yoke and said web lie in one common plane.

7. The clamp according to claim 1, wherein said web is of a thickness, measured perpendicular to the plane through said yoke which amounts to a multiple of the inside width of said seating means.

8. The clamp according to claim 1, including an elastically flexible arm connected with said yoke, said elastically flexible arm having at least one projecting hook.

9. A clamp according to claim 8, including a plurality of said hooks, each of said hooks projecting from said arm with regular mutual spacing with the first being spaced from said yoke.

10. The clamp according to claim 8, or 9 wherein said arm, said yoke, and said web lie in said one common plane.

11. The clamp according to claim 8, or 9 wherein said hooks project from said arm perpendicularly with respect to a plane through said yoke and said arm.

12. The clamp according to claim 8, wherein said hook is displaced from said first common plane more than 90° but less than 180°.

13. The clamp according to claim 9, wherein said hook is L-shaped.

14. The clamp according to claim 9, wherein said arm emanates from that end of said yoke which has only one of said three seating means.

15. A clamp as claimed in claim 1, wherein one of said legs of one of said end pieces is rounded at the top and higher than the top of said other leg.

16. A clamp as claimed in claim 1, wherein the bases of said pieces all lie in a common line of sight.

17. A clamp as claimed in claim 16, wherein said seating means are staggered relative to each other to prevent the span wire from lying in a straight line.

18. A clamp as claimed in claim 1, wherein the span of said yoke varies between 3 to 10 mm. and the length of said web varies between 20 to 40 mm.

19. A clamp as claimed in claim 1, wherein said seating means are intersected by a common plane which intersects the plane of the base of said yoke.

20. A clamp as claimed in claim 1, wherein the diameter of said web is significantly larger than the effective diameter of a wire when it is used to perform the function of the span wire to prevent the wire from growing into the clamp.

21. A clamp as claimed in claim 1, wherein the bases of said three seating means all lie in a common plane.

22. A clamp as claimed in claim 1, wherein the legs of said pieces connected with said yoke have inclined surfaces which lie in parallel planes.

* * * * *